Oct. 11, 1966

C. O. KILHAM ETAL 3,277,867

MACHINES FOR APPLYING MOLTEN THERMOPLASTIC MATERIAL

Filed March 31, 1964

*Inventors*
Roscoe L. Hill
Charles O. Kilham
By their Attorney

Oct. 11, 1966  C. O. KILHAM ETAL  3,277,867
MACHINES FOR APPLYING MOLTEN THERMOPLASTIC MATERIAL
Filed March 31, 1964  7 Sheets-Sheet 3

Oct. 11, 1966  C. O. KILHAM ETAL  3,277,867
MACHINES FOR APPLYING MOLTEN THERMOPLASTIC MATERIAL
Filed March 31, 1964

United States Patent Office 3,277,867
Patented Oct. 11, 1966

3,277,867
MACHINES FOR APPLYING MOLTEN THERMO-PLASTIC MATERIAL
Charles O. Kilham, Beverly, Mass., and Roscoe L. Hill, Norway, Maine, assignors to United Shoe Machinery Corporation, Boston, Mass., a corporation of New Jersey
Filed Mar. 31, 1964, Ser. No. 356,218
20 Claims. (Cl. 118—204)

This invention relates to a novel machine for applying molten material to a work piece and especially to a machine for applying viscous molten thermoplastic stiffening material as an adherent layer to a selected area of a shoe upper component, such for example, as the vamp portion of a shoe. Although especially adapted for applying stiffening material to shoe upper components in connection with the practice of the novel method of providing shoe components in permanently stiffened three dimensional configuration, as disclosed and claimed in a copending application for U.S. Letters Patent Serial No. 338,705, filed January 20, 1964, in the names of Adolph M. Chaplick and Conrad Rossitto, it will be understood that features of the invention are of broader utility and not limited to the exact mechanical embodiments herein illustrated.

The novel method disclosed in the mentioned application involves the application of viscous thermoplastic stiffening material as a layer, or coating, adherent to a selected area of a shoe component such, for example, as the vamp portion of a shoe upper, and it is a principal object of this invention to provide a novel machine especially well adapted for the performance of such step in an efficient and effective manner. To this end and in accordance with features of the invention, the herein illustrated machine has an applicator device, a carriage having a work supporting pad thereon which is provided with a raised portion corresponding in shape to the selected area of a work piece to which the layer of molten material is to be applied and a marginal portion adjacent to and offset from the raised portion, together with means for clamping the marginal portion of a work piece against the marginal portion of the pad thereby to present only the selected area of the work piece to the action of the applicator device during relative movements between the device and carriage, and means for effecting such relative movements between the applicator device and carriage to cause the applicator device to apply a layer of viscous molten thermoplastic stiffening material to the selected area of the work piece on the carriage.

More particularly, the applicator device in the herein illustrated machine has an applicator roll and is movable toward and into operative relation to a work piece, such as a shoe component, on the carriage while the carriage is movable from a loading position remote from the device to a position opposite thereto and then back to loading position, and power operated means, preferably fluid pressure operated means are provided for actuating the clamping means and for effecting relative movements of the carriage and the applicator device in a predetermined sequence so as to cause a work piece to be clamped on the work supporting pad, the carriage to move to present the work piece to the action of the applicator device, the device to move into operative relation to the work piece, the carriage to return to its original position thereby causing the applicator device to apply a layer of the viscous molten material on the selected area of the work piece, the applicator device to return to its inoperative position and the clamping means to release the work piece all in an automatic operating cycle.

In accordance with still another feature of the invention, the applicator device of the herein illustrated machine is operable to vary the thickness of the layer of material applied to the work piece from a minimum amount in which substantially no material is applied to a predetermined maximum thickness and means are provided for thus operating the applicator device as it begins to apply the layer of material to cause the leading edge of the layer gradually to increase in thickness from said minimum amount to said maximum thickness. More particularly, the applicator device is provided with an applicator roll and a member which serves as a scraper and is movable angularly about the axis of its roll to cause the scraper member to remove more or less of the material applied by the roll. With this novel arrangement, the layer of stiffening material is applied to the work piece with a leading edge which is "feathered" or "skived" so that when the upper component is shaped during a subsequent shoemaking operation there will be no tendency for this leading edge to show through on the outer, and exposed side of the shoe upper as an unsightly crease or ridge.

The above and other objects and features of this invention will appear in the following detailed description of the preferred embodiment thereof illustrated in the accompanying drawings and will be pointed out in the claims.

In the drawings,

FIG. 1 is a view in side elevation of a machine embodying the features of this invention;

FIG. 18 is a schematic illustration of a treadle operated valve controlling means associated with the fluid pressure operating mechanism of the machine.

Figure 2:
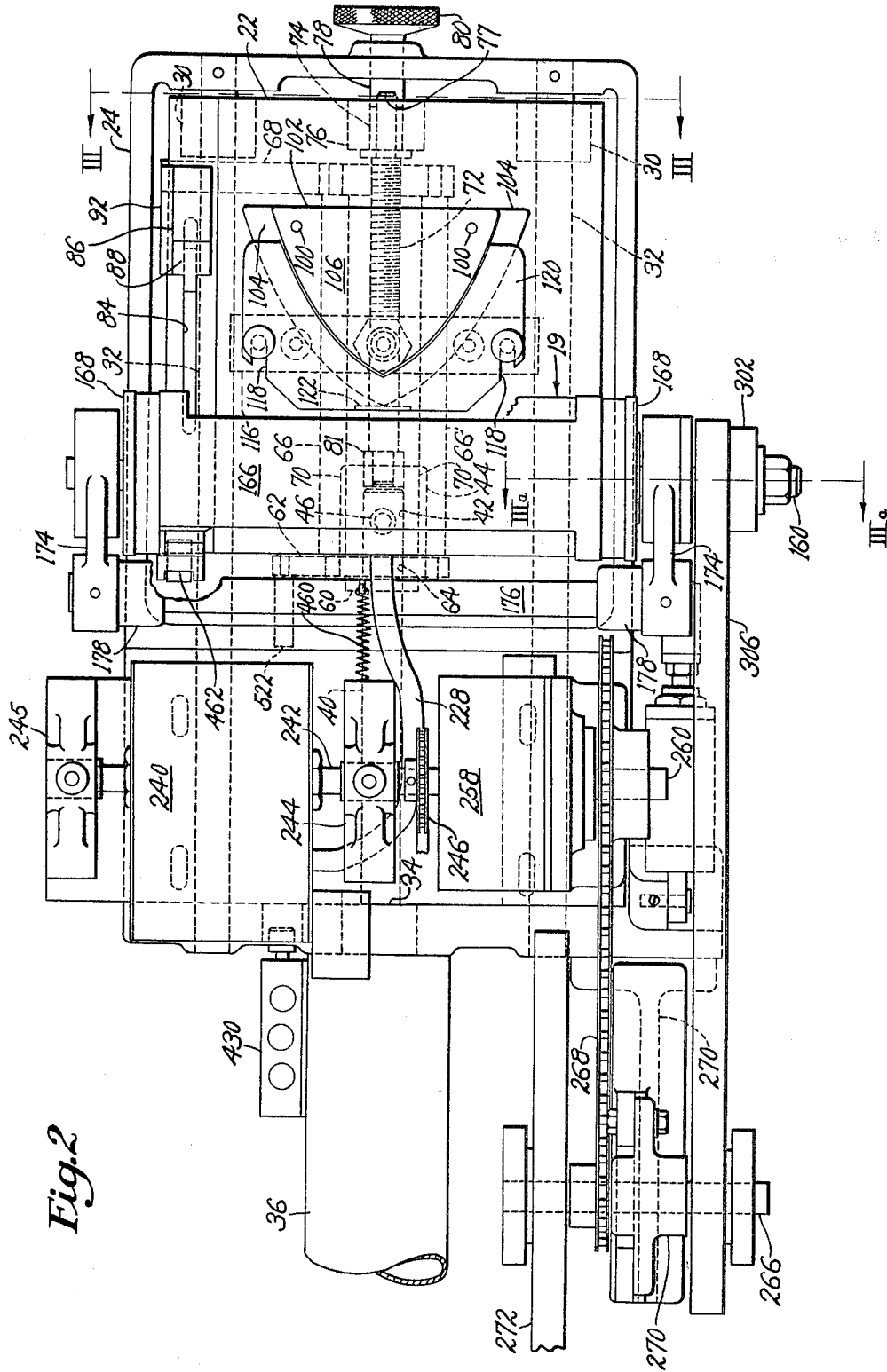
FIG. 2 is a plan view, at a somewhat enlarged scale, of the machine shown in FIG. 1.

Referring to the drawings, the machine which is illustrated therein is adapted to apply a layer L of viscous molten thermoplastic material to a selected area of a work piece, such, for example, as the vamp portion of a shoe upper. For this purpose, the machine has an applicator device, indicated generally by the reference character 19 and having an applicator roll 20, see FIGS. 3, 4, 9, 10 and 14, and a carriage 22 which is mounted for reciprocating movements on a machine frame, indicated generally by the reference character 24, FIGS. 1, 2 and 3, thus to move a work piece W, FIGS. 4, 9–14, supported thereon, past the applicator roll. The frame 24 is of hollow rectangular shape, FIGS. 1 and 2, and is intended to be supported on a suitable stand or table 26 of appropriate height.

Figure 3:
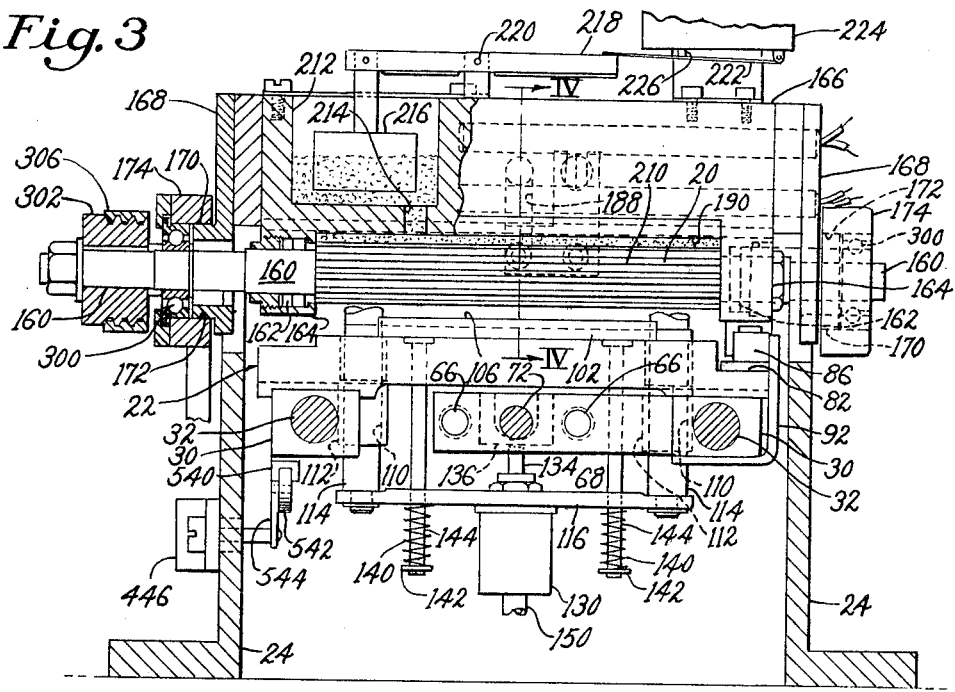
FIG. 3 is a view of the machine in vertical section taken substantially on line III—III of FIG. 2 and looking in the direction of the arrows, with some parts broken away and others shown in vertical section on line IIIa—IIIa of FIG. 2.

Referring particularly to FIGS. 1, 2 and 3, the carriage is mounted on four corner blocks 30, 30, which, in turn, are slidably supported on guide rods 32, 32 associated with the machine frame. Secured to an end wall 34 of the frame is a cylinder 36 in which there is received a piston 38, see FIG. 15, having a piston rod 40. The end of this piston rod is fitted in a bore 42 in a boss 44, formed integrally with and extending downwardly from the lower side of the carriage 22 and is secured to the boss by a setscrew 46, FIG. 2. As will be apparent by admitting fluid under pressure (i.e., compressed air) first to one end of this cylinder and then to the other end of the cylinder, while simultaneously exhausting the opposite end of the cylinder, as for example through conduits 50, 52 and a pilot operated reversing valve indicated generally by the reference character 54, the carriage may be reciprocated to the left away from and then back to the position shown in FIGS. 1 and 2. For variably limiting the extent of such excursions of the carriage from its normal position, an adjustable stop member 60 is provided, FIG. 2, for engaging the end wall 34 of the frame.

This stop member comprises a boss formed integrally on a crossbar 62 which is provided with a bore 64 through which the piston rod 40 passes. Secured to this bar on the opposite sides of the bore 64 are the left-hand ends of two rods 66, 66 which, at their opposite or right-hand end, are secured to a similar crossbar 68, the boss 44 being cut away to provide guide surfaces 70, 70 for these rods, thus preventing rotation of the bars 62 and 68. Threaded through the bar 68 is a screw 72 which is journaled at its right-hand end in a bushing 74 mounted in a boss 76 which is formed integrally on the lower side of the carriage 22, this end of the screw being machined to provide flat surfaces for operating engagement with a groove 77 in the end of an adjusting shaft 78, journaled in the frame and having a knurled knob portion 80, when the carriage is in its idle position, as shown in FIG. 2. At its left-hand end, the screw 72 has a portion of reduced diameter which is journaled in a bushing 81, received within the bore 42 of the boss 44. As will be obvious, upon rotation of the screw 72, by means of the knurled knob portion 80 of the shaft 78, the crossbars 62 and 68 may be moved to the left from the positions shown in FIG. 2, thereby to adjust the stop member 60 to a desired position. Guided for sliding movement along a shoulder surface 82 on the carriage 22, FIG. 3, by means of a slot 84, FIG. 2, is a cam block 86 provided on one end with an inclined cam surface 88 and with a flat upper surface 90, FIGS. 5–8. This cam block is connected to the crossbar 68 by means of an L-shaped piece 92, FIG. 3, and accordingly partakes of the above-mentioned adjusting movements of the stop member 60.

Resting on the upper side of the carriage 22, and held in position thereon by means of dowel pins 100, 100, is a resilient work supporting pad 102 of generally triangular shape, FIG. 2, and having a marginal shoulder 104 along two of its sides, thus to provide a raised surface 106 of substantially the same shape and size as the selected area of the work piece to which the layer of molten thermoplastic material is to be applied. Guided for vertical sliding movement in bores 110, 110, formed in the carriage and also in integrally formed downwardly extending bosses 112, 112 thereon, are two posts 114, 114 which are joined together at their lower ends by means of a crossbar 116, FIG. 3. Mounted in annular grooves formed at the upper ends of these two posts, by means of slots 118, 118 is a work clamping plate 120 shaped, as shown in FIG. 2, to conform to the marginal shoulder portions of the pad 102, and having at one side a downwardly extending lip 122, FIG. 1.

Figure 14:
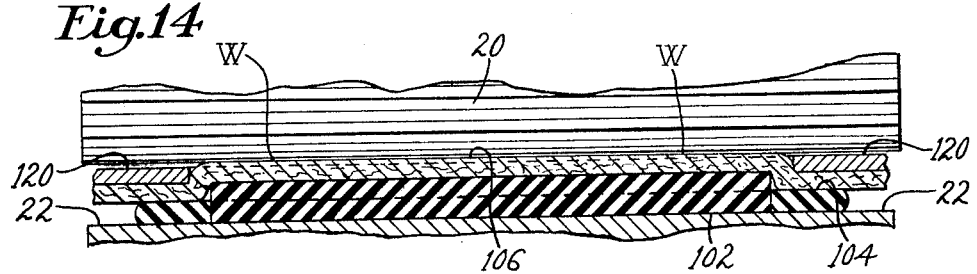
FIG. 14 is a view in elevation and at an enlarged scale of a portion of the machine shown during operation with the work piece and parts of the work piece supporting and clamping mechanism shown in vertical section.
Figure 15:
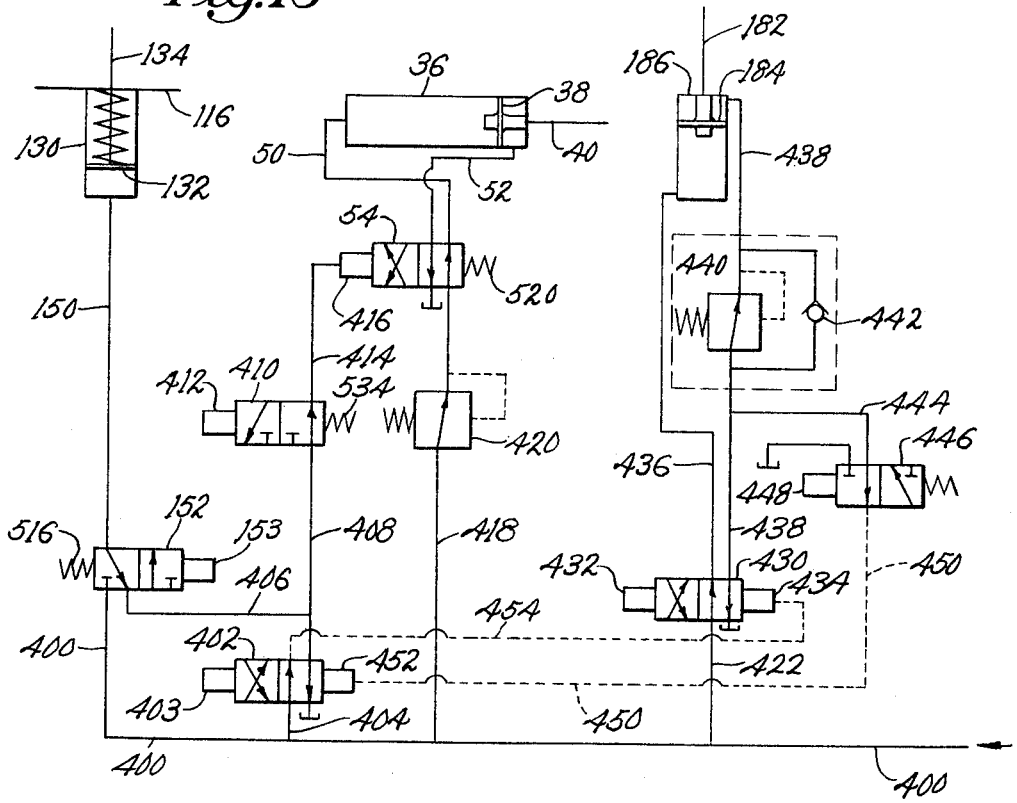
FIG. 15 is a schematic illustration of the various fluid pressure motors and control valves forming the fluid pressure operating mechanism of the machine.

Mounted on the crossbar 116 and extending downwardly therefrom is a cylinder 130 in which there is received a piston 132 having a piston rod 134, FIG. 15. This piston rod bears against an abutment block 136 on the lower side of the carriage 22. Coil springs 140, 140 interposed between the lower side of the crossbar 116 and thrust washers 142, 142 on the lower ends of rods 144, 144 carried by the carriage, tend to hold the clamping plate 120 in the elevated position in which it is shown in FIG. 1. When fluid under pressure is admitted to the space in the cylinder 130 beneath the piston 132, FIG. 15, through a conduit 150 and a valve 152, having an operating plunger 153, the cylinder 130, together with the crossbar 116, posts 114, 114 and the clamping plate 120 will be forced downwardly, thus to clamp marginal portions of a work piece W against the shoulder portions 104, 104 of the supporting pad 102, while other portions of the work piece will be supported on the raised surface 106 of the pad to present a selected area of the work piece, corresponding in shape to the shape of the surface 106, to the action of the applicator roll 20, FIGS. 4 and 14.

The applicator roll 20, which is of elongated generally cylindrical shape, FIGS. 3 and 14, is formed integrally with a shaft 160, the opposite ends of which extend outwardly through packing glands 162, 162 contained within downwardly projecting portions 164, 164 of an applicator housing block 166. Associated with this block and secured to its opposite ends are two end plates 168, 168 provided with cylindrical bearing bosses 170, 170. These bosses are each journaled in the inner portion of a bore 172 formed in the outer end of an arm 174, these arms being pivotally mounted on the machine frame by means of a rockshaft 176, journaled in bearing bosses 178, 178, FIG. 2. One of the arms 174, see FIG. 1, is formed as a bell-crank lever with a downwardly extending arm 180 which is connected at its lower end to a piston rod 182. This piston rod is associated with a piston 184, FIG. 15, received within a cylinder 186 which is pivotally mounted at one end on the machine frame 24. As will presently appear, when the machine is at rest, this piston is at the extreme end of its movement to the right, FIG. 1 (upward in FIG. 15) so that the body block 166 of the applicator device is held in the elevated position shown in FIGS. 1, 5 and 6 of the drawings. During the operation of the machine, as will presently appear, piston 184 will operate to cause the arms 174, 174 to swing in a clockwise direction, thus lowering the applicator device to the extent determined by a stop member 187 associated with the piston rod 182.

Figure 4:
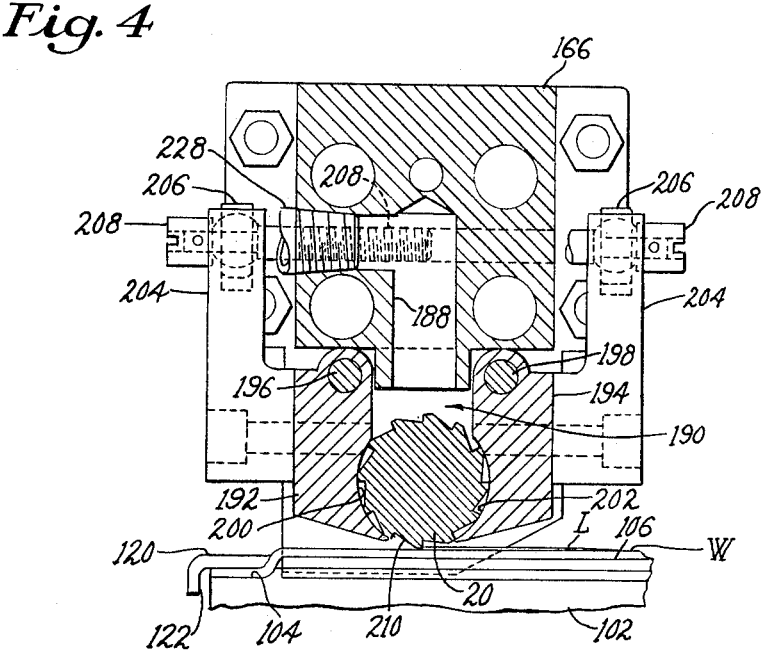
FIG. 4 is a view of a portion of the machine in vertical section taken substantially on line IV—IV of FIG. 3.
Figure 5:
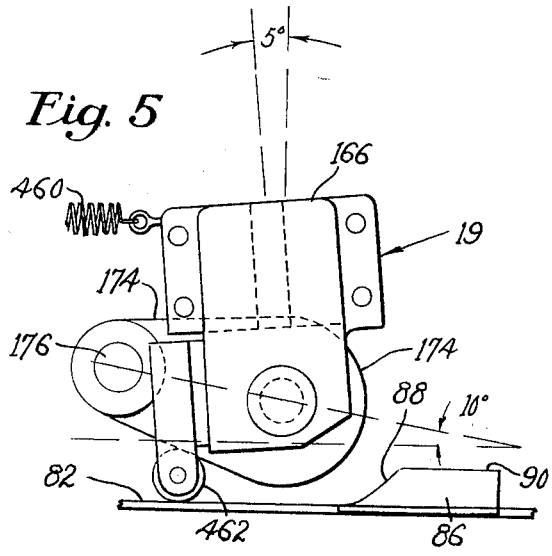
FIGS. 5–10 are a series of more or less schematic views illustrating different portions assumed by operating elements of the machine in the course of an operating cycle.
Figure 6:
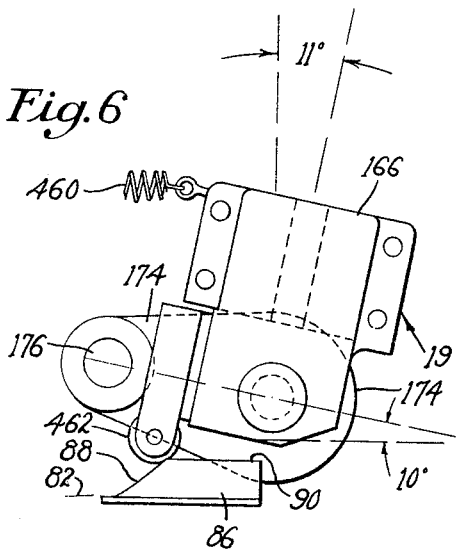

The body block 166 of the applicator device is formed with a centrally located vertical bore 188 which opens at its lower end into a chamber 190 formed by the upper portion of the roll 20 and two side plates 192, 194 which are pivotally mounted on the block by means of hinge pins 196, 198, FIG. 4. The plate 192 is formed with an arcuate surface 200 of substantially the same radius of curvature as that of the roll 20 while the plate 194 has a similar arcuate surface 202. Fastened to each plate is an upwardly extending arm 204 and connected to each arm 204, by means of a ball-and-socket joint 206, is an adjusting screw 208 which is treaded into the body of the block 166. As will be apparent, by turning the screws 208, the plates 192, 194 may be swung about their pivotal mountings so as to provide more or less clearance between their arcuate surfaces 200, 202 and the periphery of the roll 20 which, as is shown in FIGS. 3, 4 and 14, is provided with axially extending flutes 210.

The chamber 190 also communicates with another chamber 212 formed in the block 166 by means of a second vertical passage 214 which is offset from the passage 188, FIG. 3. Located within the chamber 212 is a float 216 which is secured to one end of a lever 218, pivotally mounted by means of a pin 220 on the upper surface of the block 166. Resting on the other end of this lever is one end of a thin metallic spring strip 222 which is pivotally mounted at its other end on a microswitch body 224. This switch has an operating plunger 226 which bears on the strip 222 midway between its opposite ends. As will presently appear, the switch 224 is adapted to control the operation of mechanism for supplying molten thermoplastic material to the vertical bore 188, and hence to the chambers 190 and 212 through a flexible hose 228 which is connected to the vertical passage 188, FIG. 4.

Although any suitable source may be utilized to supply molten thermoplastic material under pressure to the hose 228 and thence to the chambers 190 and 212, of the applicator device, in the herein illustrated machine the following arrangement is provided. Mounted on an upper surface of the machine frame 24 is a so-called melt body 240 which is a part of a well-known type of apparatus for melting and feeding thermoplastic material (see for example U.S. Patent No. 2,884,922, issued on May 5, 1959, in the name of Hans C. Paulsen), which device is adapted to receive thermoplastic material in the form of a flexible rod R, to melt the solid rod of material within the melting body and to deliver the molten material under pressure from a discharge orifice to which the hose 228 is connected. Thus the rod material melting and feeding device will include one or more disk-like melting and feeding members, not shown, which are adapted to be rotated by means of a main drive shaft 242 mounted in bearings 244, 245, FIG. 2. Carried by one end of this shaft, adjacent to the bearing 244, is a sprocket 246 from which there extends a chain 248 adapted to drive another sprocket 250 which is associated with the drive mechanism of two feed wheels 252, 254 adapted to feed the rod R into the melt body 240.

This end of the shaft 242 is also associated with a magnetic clutch, of conventional design and indicated generally by the reference character 258, having an input shaft 260 carrying a drive sprocket 262, FIG. 1. Extending from the sprocket 262 to another sprocket 264 on a countershaft 266 is a chain 268. This countershaft is mounted on a bracket 270 and carries a large input pulley 272 and a smaller output pulley 274. Supported on the lower side of the table or platform 26 is an electric motor 280 adapted to drive the input pulley 272, referred to above, by means of a belt 282. As is shown in FIG. 3 of the drawings, the shaft 160 is journaled at its opposite ends in bearings 300, 300 mounted in the arms 174, 174. Also, the left-hand end of the shaft 160, as viewed in FIG. 3, extends outwardly beyond its bearing 300 and carries a pulley 302. Extending from this pulley to the output pulley 274 is a drive belt 306.

Figure 16:
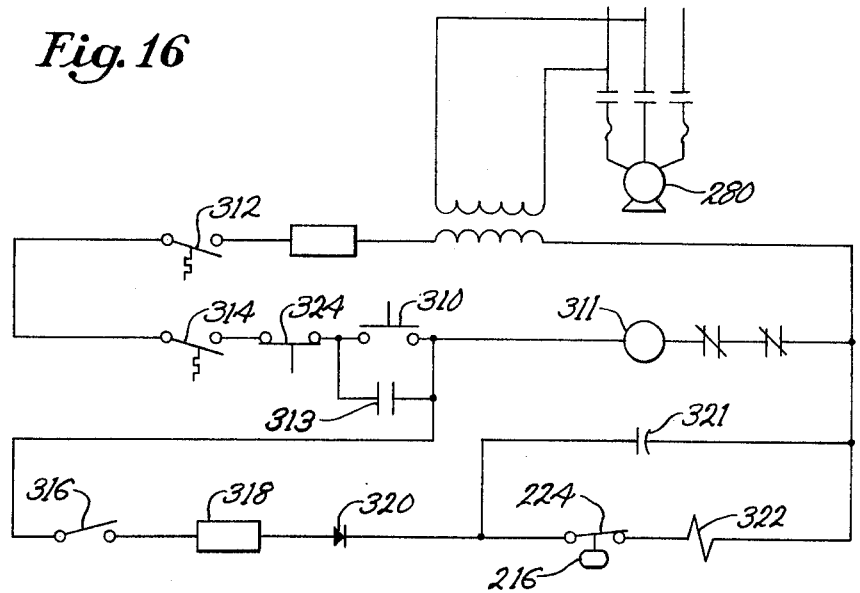
FIG. 16 is a wiring diagram of the electrical system provided for supplying power to the operating elements of the machine.

As will be apparent from an inspection of FIG. 16 of the drawings, the motor 280 may be started by the closure of an "On" switch 310, provided that two temperature controlled switches 312, 314 associated respectively with the melt pot 240 and the applier pot 166, are closed as the result of these two devices having reached a suitable operating temperature. The closure of the switch 310, by energizing the coil 311 of a relay having a contact 313, also energizes a direct current circuit including a manual switch 316 and resistor 318, a rectifier 320 and a capacitor 321, which circuit supplies current to the coil 322 of the magnetic clutch 258 through the aforementioned float control switch 224. The motor may be stopped and the D.C. circuit de-energized by means of an "off" switch 324.

Figure 17:
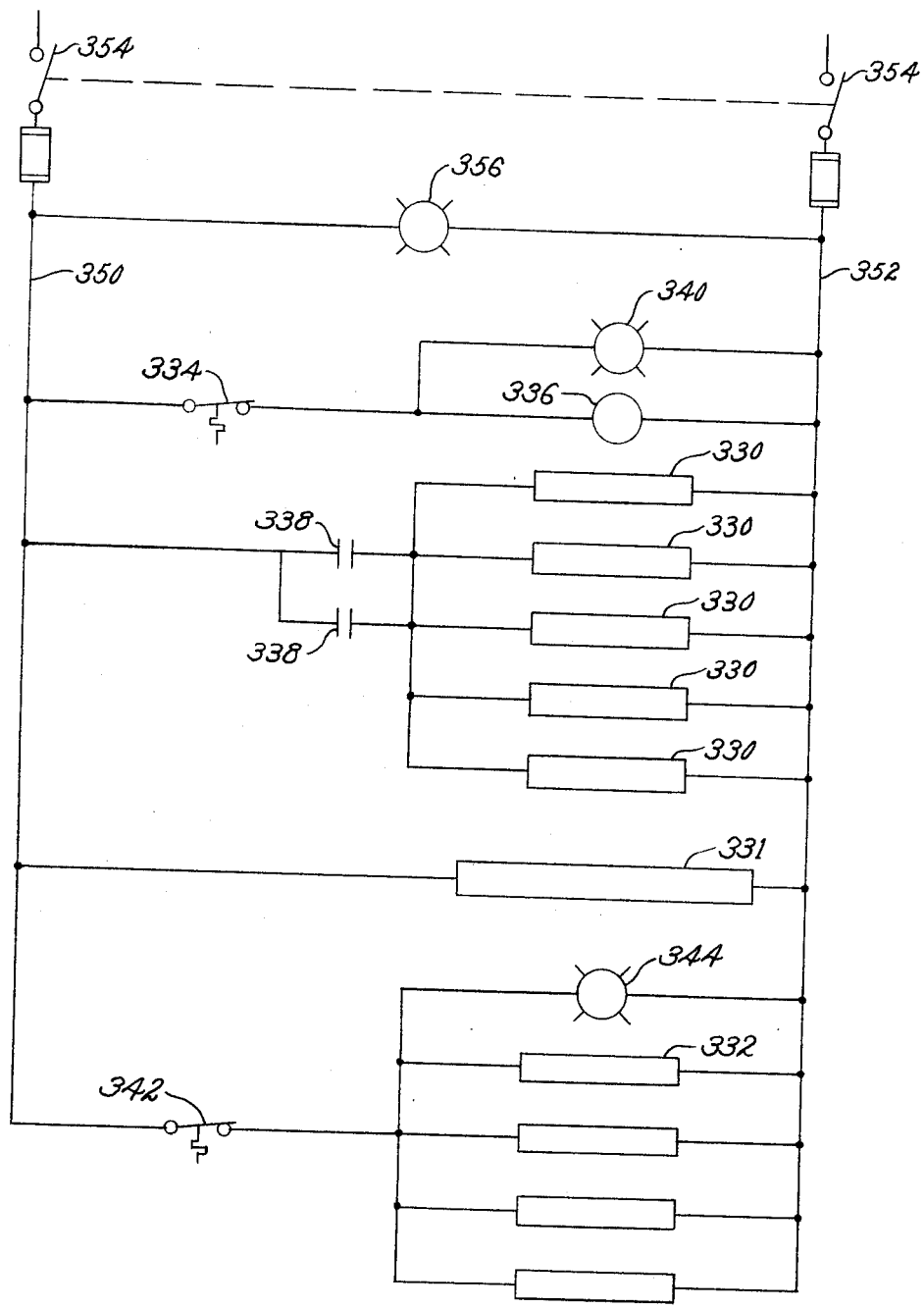
FIG. 17 is a wiring diagram of the electrical system for supplying power to various heating elements associated with the machine.

In FIG. 17, the electrical circuit associated with a plurality of heaters 330, associated with the melt pot 240, a heating coil 331 incorporated in the flexible hose 228, and a plurality of heaters 332 associated with the applier body 166 is diagrammatically illustrated. A thermostat 334 is arranged to regulate the temperature of the melt pot by controlling the flow of electrical energy to the coil 336 of a relay having two contacts 338, 338. A signal light 340 indicates when the heaters 330 are energized. Another thermostat 342 directly controls the flow of electrical energy to the heaters 332 associated with the applier body 166 as indicated by a signal light 344. The hose coil 331 is connected directly across the feed lines 350, 352, which are adapted to be connected to a suitable power source through a main switch 354, as is also a third signal light 356. With the view of simplifying the disclosure, the various electrical heaters, thermostat temperature control switches, signal lights and other electrical devices have not been shown as associated with the mechanical construction of the apparatus. It will be understood that these electrical controlling elements are appropriately located and are arranged in the manner diagrammatically illustrated in FIGS. 16 and 17.

Referring to FIG. 15, operating fluid under pressure (e.g. compressed air) is supplied to the valve 152, referred to above, directly from a main supply line 400 which is connected to a manually operable valve 402 having an operating plunger 403, by means of a branch conduit 404. This valve has two outlets, one of which is connected to the valve 152 by a conduit 406 branching from a conduit 408 which leads to a cam-operated valve 410 having an operating plunger 412. When the valve 410 is in the position in which it is shown, the conduit 408 is connected to a conduit 414 which leads to the pilot operating piston 416 of the valve 54, also referred to above. Operating fluid is conducted to the valve 54 by means of a conduit 418 which branches off from the main supply line 400 and which passes through a pressure reducing valve 420. Another conduit 422, also branching from the main supply line 400, leads to a control valve 430 having an operating plunger 432 and a pilot operating piston 434. The valve 430 has two outlets, one of which is connected to the lower end of the cylinder 186, FIG. 15 (left end of this cylinder as shown in FIG. 1) when the valve is in the position shown, while the other outlet is connected to a conduit 438 which leads to the opposite end of the cylinder 186 through a pressure reducing valve 440, which in one direction of flow through conduit 438 is by-passed through a one-way check valve 442. A conduit 444 branching from the conduit 438 leads to a valve 446 having an operating plunger 448 and an outlet which, when the valve is in the position shown in FIG. 15, is connected to a conduit 450 leading to a pilot operating piston 452 associated with the valve 402. The valve 402 has a second outlet which, when the valve is in the position shown, is connected to a conduit 454 leading to the pilot operating piston 434 of the valve 430.

Referring to FIG. 1, a coil spring 460 stretched between the applier body 166 and the melt body 240, tends to swing the applicator device 19 yieldingly in a counter-clockwise direction, see also FIGS. 5–8, to an extent permitted by the engagement of a cam roll 462 mounted adjacent to one end of the applicator device, see FIG. 2, with the shoulder surface 82 on the carriage or with a portion of the cam block 86. Also, the side plate 194 associated with the applier body 166 has an angularly disposed lower surface 464, FIGS. 9 and 10. When the applicator device 19 is in its lowermost position and swung in a clockwise direction as the result of the engagement of the cam roll 462 with the uppermost part of the cam surface 88 on the block 86, FIG. 7, the left-hand edge of the surface 464 will engage the upper side of a work piece W, clamped on the pad 106 by the clamp member 120, thus holding the fluted operating surface of the applicator roll 20 spaced away from the work piece, see FIG. 9. However, as soon as the carriage is moved to the right with respect to the applicator device, to carry the work piece W past the roll 20, see arrows FIGS. 9 and 10, the cam roll 462 will ride down along the cam surface 88 and onto the surface 82 of the carriage, FIG. 8, and the spring 460 will rock the applicator device in a counter-clockwise direction, thus gradually lowering the roll 20 into operating relation with the work piece and elevating the leading edge of the surface 464 on side plate 194 to the position shown in FIG. 10. As the result of this action the molten thermoplastic material will be applied to the work piece as a layer L having a beveled or "skived" edge in the location where the layer was first applied to the work piece in a manner explained below.

Figure 11:
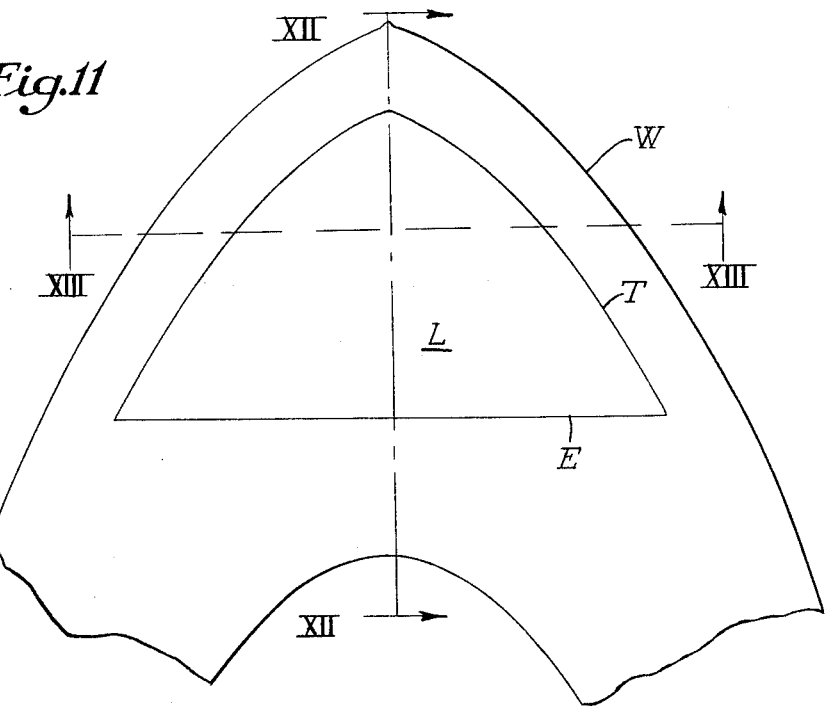
FIG. 11 is a plan view of a work piece after the application to a selected area thereof of molten thermoplastic material.
Figure 12:
FIG. 12 is a view of the work piece shown in FIG. 11 in vertical section on line XII—XII and looking in the direction of the arrows.
Figure 13:
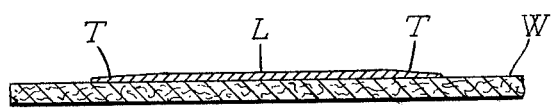
FIG. 13 is a view of the work piece shown in FIG. 11 in vertical section taken on line XIII—XIII of FIG. 11 and looking in the direction of the arrows.

In using the machine, which has been described above, with the various parts in the positions shown in FIGS. 1, 2 and 3, the operator first places a work piece W, e.g. the vamp portion of a shoe upper, FIG. 11, on the supporting pad 102 with its extreme toe end in engagement with the downwardly turned lip 122, thus locating the work piece in a lengthwise direction, and centers it laterally on the pad and with respect to the clamping member 120. While holding the work piece loosely in this position, the operator actuates the valve 152 by means of its plunger 153 to admit operating fluid to the cylinder 130, thus causing the work piece to be clamped firmly upon the pad 102 by the clamp member 120 with its marginal portion held down on the flat shoulder 104, 104 of the pad and with a mid-portion thereof, corresponding to the selected area to which the molten themoplastic material is to be applied, held in an elevated or raised position to receive the molten material from the applicator roll 20, FIG. 14. Next, while holding the valve 152 shifted, the operator actuates the valve 402, by means of its operating plunger 403, to connect the conduit 408 to the main pressure line 400 through the branch conduit 404, thereby initiating an automatic operating cycle, which is about to be described, and as soon as this operating cycle begins, valve operating plungers 153 and 403 are released. Valve 152 now returns to its original position, as shown in FIG. 15, while valve 402 remains in the position to which it was shifted by the operator until near the end of the operating cycle.

To facilitate the above actuation of the valve operating plungers 153 and 403 in the proper sequence, the herein illustrated machine is provided with a treadle mechanism schematically illustrated in FIG. 18 of the drawings. Pivotally mounted on a rockshaft 500 is a treadle indicated generally by the character 502. Extending upwardly from one end of this treadle is an abutment member 504 having an offset end 506 which is in vertical alignment with the operating plunger 403 of the valve 402. Pivoted on this same end of the treadle is an L-shaped arm 508 which is urged yieldingly into engagement with the offset end 506 of the abutment member 504 by a coil spring 510. The treadle is held yieldingly in the angular position in which it is shown in FIG. 18 by a coil spring 512 and a stop 514 and when the treadle is in this position the outer end of the arm 508 just touches the valve operating plunger 153 of the valve 152 without, however, moving it against the resistance of a return spring 516, FIG. 15. As will be apparent, an initial depression of the treadle 502 will actuate the operating plunger 153 and thus shift the valve 152 against the resistance of the spring 516 and will bring the opposite end 506 of the abutment member 504 into engagement with the operating plunger 403 of the valve 402, whereupon the engagement of the treadle 502 with still another coil spring 518 will signal the operator that this stage in the movement of the treadle has been reached. Now, upon a continued depression of the treadle, valve 402 will be shifted by its operating plunger 403 as the spring 510 yields to permit such action. Upon release of the treadle when the operating cycle has been commenced, valve 152 is immediately returned to its original position by spring 516 while valve 402 remains in its shifted position, as explained above.

Turning again to the operation of the machine, operating fluid admitted to the conduit 408, as a result of the shifting of the valve 402, acts on the pilot piston 416 of the valve 54 to shift this valve against the resistance of a return spring 520, thus causing the piston 38 to be driven to the left, FIG. 15, thereby moving the carriage in- wardly, i.e. to the left, FIGS. 1 and 2, to the extent determined by the adjustable stop member 60, referred to above. Also mounted on the crossbar 62 on which the stop member 60 is carried is a valve operating member 522, FIG. 2, which, when movement of the carriage in the mentioned direction is terminated by the engagement of the adjustable stop member 60 with the end wall 34 of the machine frame, engages the operating plunger 432 of the valve 430 and shifts this valve from the position in which it is shown in FIG. 15, thereby connecting the conduit 438 to the main pressure line 400 through branch conduit 422. Operating fluid is now admitted through the pressure regulator valve 440 to the upper end of the cylinder 186, FIG. 15 (right-hand end, FIG. 1) while the opposite end of this cylinder is connected to exhaust. The arms 174, 174 are now swung in a clockwise direction, FIG. 1, thus to lower the applicator device 19 into operating position, i.e., from the position shown in FIG. 6 to the position shown in FIG. 7 with the cam roll 462 in engagement with the extreme upper end of the cam surface 88 on the cam block 86 which assumes an adjusted position corresponding to that of the stop member 60. The applier body 166 will now be tilted in a clockwise direction so that the leading edge of the surface 464 on the side plate 194 is in engagement with the upper side of the work piece W, see FIG. 9. The adjustable stop 187, FIG. 1, will now be spaced slightly away from an abutment plate 530, carried by the cylinder 186, while a valve actuating member 532 associated with this adjustable stop will have engaged the valve operating plunger 412 of the valve 410 and shifted this valve against the resistance of a return spring 534. The valve 54 will now be returned to its original position by its return spring 520 so that piston 38 moves the carriage outwardly, to the right in FIG. 1.

Figure 7:
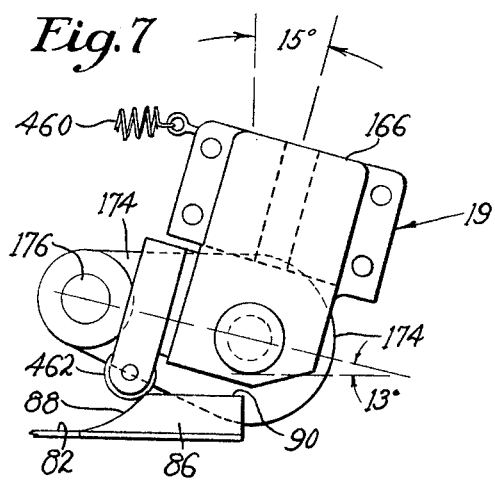
Figure 8:
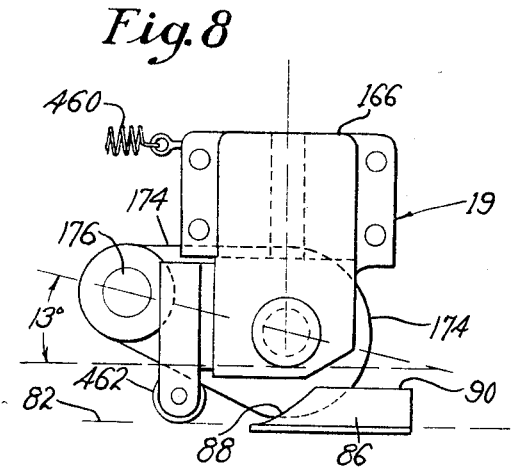
Figure 9:
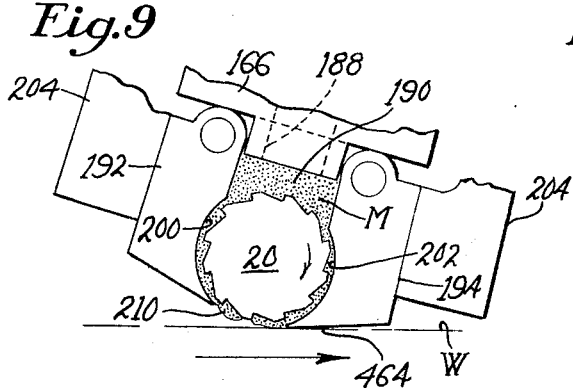
Figure 10:
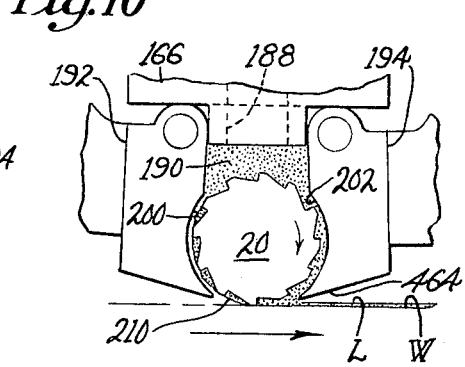

At the beginning of this outward movement of the carriage, the cam roll 462 rides down along the cam surface 88, FIGS. 7 and 8, and the applier body is tilted in a counterclockwise direction, from the position shown in FIG. 9, to that shown in FIG. 10 by the action of the coil spring 460. During this tilting movement the applier device is lowered slightly until the roll 20 lightly contacts, or nearly contacts the upper surface of the work piece W and the leading edge of the surface 464 on the side plate 194 is moved upwardly and away from the work piece, see FIG. 10. Stop member 187 will now very nearly engage the abutment member 530.

As is explained above, the chamber 190 is kept filled with the molten thermoplastic material M by the action of the melting and feeding device under the control of the float operated switch 224 and magnetic clutch 258, and this material fills the fluted surface of the roll 20. Accordingly, when the parts have assumed the positions shown in FIG. 10, a layer L of the molten material will be applied to the work piece W as the carriage continues to move outwardly to the right in FIG. 1. By swinging the side plate 194 toward or away from the roll 20, by means of screw 208, so that its arcuate surface 202 is closer to or farther away from the periphery of the roll, the thickness of the layer L may be varied within limits, the side plate 194 thus acting as a metering bar. The other side plate 192 is preferably so adjusted that its arcuate surface 200 is spaced just slightly farther from the periphery of the roll than is the surface 202 of the plate 194. Also, the thickness of the layer of material may be varied, at least to some extent, by adjustment of the stop member 187 to alter the relationship of the roll 20 to the work piece. At the beginning of the outward movement of the carriage, as the applicator device is being lowered to bring the roll 20 into operative relation to the work piece and as the leading edge of the surface 464 of the side plate 194 moves upwardly and away from the work piece, this leading edge acts as a scraper which progressively removes less and less of the layer L being applied to the work piece by the roll 20. Because of this scraping action, a "feather" or "skived" leading edge E is produced in the location where the layer L is first applied, see FIG. 12. Referring to FIG. 14, when the work piece W is clamped against the pad 102 by the clamp member 120, its marginal edges are deflected downwardly and adjacent portions tend to bulge upwardly to a slight extent. This apparently causes the layer L of molten material applied to the work piece gradually to taper down in thickness along its opposite sides, at least to some extent, as indicated at T, T in FIG. 13.

When the carriage 22 completes its outward movement the valve operating plunger 448 of the valve 446 is actuated by means including a cam 540 on the carriage, FIG. 3, and a cam roll 542 and operating arm 544, to return this valve to its original position, as shown in FIG. 15. Operating fluid will now be admitted to conduit 450 and thence to the pilot operated plunger 452 of the valve 402, returning this valve to its original position. Cylinder 130 will now be connected to exhaust so that the clamping member 120 is elevated by the springs 140, 140, FIG. 3, thereby releasing the work piece W for removal by the operator. Operating fluid is also admitted to the conduit 454 through the valve 402 and thence to the pilot operating piston 434 of the valve 430 which is returned to its original position in which operating fluid is admitted to the lower portion of the cylinder 186. Piston 184 now swings the arms 174, 174 in a counterclockwise direction, FIG. 1, to elevate the applier device 19 to its original position, thus completing the operating cycle.

In the event that the operator had failed to release the treadle 502 after initiating the operating cycle, the machine will still come to a stop after the carriage has completed its outward movement and a layer of molten material has been applied to a work piece thereon. However, the work piece will not be released or the applier device elevated until the operator does release the treadle.

As shown in the drawings, FIGS. 4, 11–14, the work piece W therein illustrated is the vamp portion of the upper of a shoe. It will, of course, be understood that the work supporting pad 102 and associated clamp member 120 may be suitably shaped to accommodate other shoe components, for example, the quarter portion of an upper, as suggested in the copending application referred to above. The layer L of molten thermoplastic material which is applied in adherent relation to a selected area of the vamp is intended to serve the same purpose as the usual separately applied piece of box toe material. Thus, in accordance with the novel method disclosed in the mentioned copending application, this layer of material is softened by heat or heat and moisture prior to the shaping of the toe end of the vamp portion of the upper to a last and is thereafter cooled and stiffened thus to preserve the shape imparted to it. The provision of the "feathered" or "skived" edge E at the leading margin of the layer L results in a very significant and practical advantage, particularly where the layer L is of substantial thickness, by avoiding the formation of a sharp line of demarkation between the layered and unlayered portions of the vamp, which line of demarkation might show through the vamp in the finished shoe as an unsightly line or crease. As will be apparent by adjusting the stop member 60, by means of the knob 80, FIG. 1, and with it the cam block 86, the length of the layer L, FIG. 11, may be varied. Also, the work supporting pad 102 can be removed and replaced by another similar pad of a different shape to accommodate work pieces of other configuration, e.g. the quarter portion of a shoe upper.

Having thus described our invention, what we claim as new and desire to secure by Letters Patent of the United States is:

1. A machine for applying viscous molten thermoplastic material as a layer adherent to a selected area of a work piece, comprising an applicator device, a carriage, a work supporting pad on said carriage having a raised portion corresponding in shape to the selected area of the work piece to which said layer is to be applied and a marginal portion adjacent to and offset from said raised portion, means for clamping marginal portions of a work piece against the marginal portion of the work supporting pad thereby to present only said selected area of the work piece to the action of the applicator device during relative movements between said device and the carriage to cause the device to act on the work piece, and means for effecting such relative movements between the applicator device and the carriage.

2. A machine for applying viscous molten thermoplastic material as a layer adherent to a selected area of a work piece, comprising an applicator device, a carriage, a work supporting pad on said carriage having a raised portion corresponding in shape to the selected area of the work piece to which said layer is to be applied and a marginal portion adjacent to and offset from said raised portion, means for clamping marginal portions of a work piece against the marginal portion of the work supporting pad thereby to present only said selected area of the work piece to the action of the applicator device during relative movements between said device and the carriage to cause the device to act on the work piece, and power operated means for effecting such relative movements between the applicator device and the carriage.

3. A machine for applying viscous molten thermoplastic material as a layer adherent to a selected area of a work piece, comprising an applicator device, a carriage, a work supporting pad on said carriage having a raised portion corresponding in shape to the selected area of the work piece to which said layer is to be applied and a marginal portion adjacent to and offset from said raised portion, means for clamping marginal portions of a work piece against the marginal portion of the work supporting pad thereby to present only said selected area of the work piece to the action of the applicator device during relative movements between said device and the carriage to cause the device to act on the work piece, and fluid pressure operated means for effecting such relative movements between the applicator device and the carriage.

4. A machine for applying viscous molten thermoplastic material as a layer adherent to a selected area of a work piece, comprising an applicator device having an applicator roll, a carriage, a work supporting pad on said carriage having a raised portion corresponding in shape to the selected area of the work piece to which said layer is to be applied and a marginal portion adjacent to and offset from said raised portion, means for clamping marginal portions of a work piece against the marginal portion of the work supporting pad thereby to present only said selected area of the work piece to the action of the applicator device during relative movements between said device and the carriage to cause the device to act on the work piece, and means for effecting such relative movements between the applicator device and the carriage.

5. A machine for applying viscous molten thermoplastic material as a layer adherent to a selected area of a work piece, comprising an applicator device having an applicator roll, a carriage, a work supporting pad on said carriage having a raised portion corresponding in shape to the selected area of the work piece to which said layer is to be applied and a marginal portion adjacent to and offset from said raised portion, means for clamping marginal portions of a work piece against the marginal portion of the work supporting pad thereby to present only said selected area of the work piece to the action of the applicator device during relative movements between said device and the carriage to cause the device to act on the work piece, and power operated means for effecting such relative movements between the applicator device and the carriage.

6. A machine for applying viscous molten thermoplastic material as a layer adherent to a selected area of a work piece, comprising an applicator device having an applicator roll, a carriage, a work supporting pad on said carriage having a raised portion corresponding in shape to the selected area of the work piece to which said layer is to be applied and a marginal portion adjacent to and offset from said raised portion, means for clamping marginal portions of a work piece against the marginal portion of the work supporting pad thereby to present only said selected area of the work piece to the action of the applicator device during relative movements between said device and the carriage to cause the device to act on the work piece, and fluid pressure operated means for effecting such relative movements between the applicator device and the carriage.

7. A machine for applying viscous molten thermoplastic material as a layer adherent to a selected area of a work piece comprising an applicator device, a carriage movable from a loading position remote from said device to a position opposite to said device and then back to loading position, a work supporting pad on the carriage having a raised portion corresponding in shape to the selected area of the work piece to which said layer is to be applied and a marginal portion adjacent to and offset from said raised portion, means for clamping marginal portions of a work piece against the marginal portion of the work supporting pad thereby to present only said selected area of the work piece to the action of said device during relative movements between said device and the carriage, said applicator device being movable from an inoperative position toward and into opeartive relation to a work piece on the carriage, and means for actuating said clamping means and for effecting relative movements of the carriage and applicator device in predetermined sequence to cause the work piece to be clamped on the pad, the carriage to move to present the work piece to the device, the device to move into operative relation to the work piece, the carriage to return to its original position, thereby causing the applicator device to apply a layer of the viscous molten thermoplastic material on the selected area of the work piece, the applicator device to return to its inoperative position and the clamping means to release the work piece.

8. A machine for applying viscous molten thermoplastic material as a layer adherent to a selected area of a work piece comprising an applicator device, a carriage movable from a loading position remote from said device to a position opposite to said device and then back to loading position, a work supporting pad on the carriage having a raised portion corresponding in shape to the selected area of the work piece to which said layer is to be applied and a marginal portion adjacent to and offset from said raised portion, means for clamping marginal portions of a work piece against the marginal portion of the work supporting pad thereby to present only said selected area of the work piece to the action of said device during relative movements between said device and the carriage, said applicator device being movable from an inoperative position toward and into operative relation to a work piece on the carriage, and power operated means for actuating said clamping means and for effecting relative movements of the carriage and applicator device in predetermined sequence to cause the work piece to be clamped on the pad, the carriage to move to present the work piece to the device, the device to move into operative relation to the work piece, the carriage to return to its original position thereby causing the applicator device to apply a layer of the viscous thermoplastic material on a selected area of the work piece, the applicator device to return to its inoperative position and the clamping means to release the work piece.

9. A machine for applying viscous molten thermoplastic material as a layer adherent to a selected area of a work piece comprising an applicator device, a carriage movable from a loading position remote from said device to a position opposite to said device and then back to loading position, a work supporting pad on the carriage having a raised portion corresponding in shape to the selected area of the work piece to which said layer is to be applied and a marginal portion adjacent to and offset from said raised portion, means for clamping marginal portions of a work piece against the marginal portion of the work supporting pad thereby to present only said selected area of the work piece to the action of said device during relative movements between said device and the carriage, said applicator device being movable from an inoperative position toward and into operative relation to a work piece on the carriage, and fluid pressure operated means for actuating said clamping means and for effecting relative movements of the carriage and applicator device in predetermined sequence to cause the work piece to be clamped on the pad, the carriage to move to present the work piece to the device, the device to move into operative relation to the work piece, the carriage to return to its original position, thereby causing the applicator device to apply a layer of the viscous molten thermoplastic material to the selected area of the work piece, the applicator device to return to its inoperative position and the clamping means to release the work piece.

10. A machine for applying viscous molten thermoplastic material as a layer adherent to a selected area of a work piece comprising an applicator device having an applicator roll, a carriage movable from a loading position remote from said device to a position opposite to the device and then back to loading position, a work supporting pad on the carriage having a raised portion corresponding in shape to the selected area of the work piece to which said layer is to be applied and a marginal portion adjacent to and offset from said raised portion, means for clamping marginal portions of a work piece against the marginal portion of the work supporting pad thereby to present only said selected area of the work piece to the action of said device during relative movements between the device and the carriage, said applicator device being movable from an inoperative position toward and into operative relation to a work piece on the carriage, and means for actuating said clamping means and for effecting relative movements of the carriage and applicator device in predetermined sequence to cause the work piece to be clamped on the pad, the carriage to move to present the work piece to the device, the device to move into operative relation with the work piece, the carriage to return to its original position thereby causing the applicator device to apply a layer of the viscous molten thermoplastic material on the selected area of the work piece, the applicator device to return to its inoperative position and the clamping means to release the work piece.

11. A machine for applying viscous molten thermoplastic material as a layer adherent to a selected area of a work piece comprising an applicator device having an applicator roll, a carriage movable from a loading position remote from said device to a position opposite to the device and then back to loading position, a work supporting pad on the carriage having a raised portion corresponding in shape to the selected area of the work piece to which said layer is to be applied and a marginal portion adjacent to and offset from said raised portion, means for clamping marginal portions of a work piece against the marginal portion of the work supporting pad thereby to present only said selected area of the work piece to the action of said device during relative movements between the device and the carriage, said applicator device being movable from an inoperative position toward and into operative relation to a work piece on the carriage, and power operated means for actuating said clamping means and for effecting relative movements of the carriage and applicator device in predetermined sequence to cause the work piece to be clamped on the pad, the carriage to move to present the work piece to the device, the device to move into operative relation with the work piece, the carriage to return to its original position, thereby causing the applicator device to apply a layer of the viscous molten thermoplastic material on the selected area of the work piece, the applicator device to return to its inoperative position and the clamping means to release the work piece.

12. A machine for applying viscous molten thermoplastic material as a layer adherent to a selected area of a work piece comprising an applicator device having an applicator roll, a carriage movable from a loading position remote from said device to a position opposite to the device and then back to loading position, a work supporting pad on the carriage having a raised portion corresponding in shape to the selected area of the work piece to which said layer is to be applied and a marginal portion adjacent to and offset from said raised portion, means for clamping marginal portions of a work piece against the marginal portion of the work supporting pad thereby to present only said selected area of the work piece to the action of said device during relative movements between the device and the carriage, said applicator device being movable from an inoperative position toward and into operative relation to a work piece on the carriage, and fluid pressure operated means for actuating said clamping means and for effecting relative movements of the carriage and applicator device in predetermined sequence to cause the work piece to be clamped on the pad, the carriage to move to present the work piece to the device, the device to move into operative relation with the work piece, the carriage to return to its original position, thereby causing the applicator device to apply a layer of the viscous molten thermoplastic material on the selected area of the work piece, the applicator device to return to its inoperative position and the clamping means to release the work piece.

13. A machine for applying viscous molten thermoplastic material as a layer adherent to the surface of a work piece comprising an applicator device operable to vary the thickness of the layer of material applied to the work piece from a minimum in which substantially no material is applied to a predetermined maximum thickness, a work supporting carriage, means for effecting relative movements between said applicator device and said carriage, first to bring the device into operative relation with a work piece on the carriage and then to cause the device to apply a layer of material on the work piece, and means for operating said device as it begins to apply said layer of material to cause the leading edge of said layer gradually to increase in thickness from said minimum to said predetermined maximum thickness.

14. A machine for applying viscous molten thermoplastic material as a layer adherent to the surface of a work piece comprising an applicator device operable to vary the thickness of the layer of material applied to the work piece from a minimum in which substantially no material is applied to a predetermined maximum thickness, a work supporting carriage, power operated means for effecting relative movements between said applicator device and said carriage, first to bring the device into operative relation with a work piece on the carriage and then to cause the device to apply a layer of material on the work piece, and means for operating said device as it begins to apply said layer of material to cause the leading edge of said layer gradually to increase in thickness from said minimum to said predetermined maximum thickness.

15. A machine for applying viscous molten thermoplastic material as a layer adherent to the surface of a work piece comprising an applicator device operable to vary the thickness of the layer of material applied to the work piece from a minimum in which substantially no material is applied to a predetermined maximum thickness, a work supporting carriage, fluid pressure operated means for effecting relative movement between said applicator device and said carriage, first to bring the device into operative relation with a work piece on the carriage and then to cause the device to apply a layer of material on the work piece, and means for operating said device as it begins to apply said layer of material, causing the leading edge of said layer gradually to increase in thickness from said minimum to said predetermined maximum thickness.

16. A machine for applying viscous molten thermoplastic material as a layer adherent to the surface of a work piece comprising an applicator device having an applicator roll and a scraper member and movable angularly about the axis of said roll to cause the scraper to remove more or less of the material applied by the roll to vary the thickness of the layer of material applied to the work piece from a minimum in which substantially no material is applied to a predetermined maximum thickness, a work supporting carriage, means for effecting relative movements between said applicator device and said carriage, first to bring the device into operative relation with a work piece on the carriage and then to cause the device to apply a layer of material on the work piece, and means for effecting angular movement of said device as it begins to apply said layer of material to cause the leading edge of said layer gradually to increase in thickness from said minimum to said predetermined maximum thickness.

17. A machine for applying viscous molten thermoplastic material as a layer adherent to the surface of a work piece comprising an applicator device having an applicator roll and a scraper member and movable angularly about the axis of said roll to cause the scraper to remove more or less of the material applied by the roll to vary the thickness of the layer of material applied to the work piece from a minimum in which substantially no material is applied to a predetermined maximum thickness, a work supporting carriage, power operated means for effecting relative movements between said applicator device and said carriage, first to bring the device into operative relation with a work piece on the carriage and then to cause the device to apply a layer of material on the work piece and means for effecting angular movement of said device as it begins to apply said layer of material to cause the leading edge of said layer gradually to increase in thickness from said minimum to said predetermined maximum thickness.

18. A machine for applying viscous molten thermoplastic material as a layer adherent to the surface of a work piece comprising an applicator device having an applicator roll and a scraper member and movable angularly about the axis of said roll to cause the scraper to remove more or less of the material applied by the roll to vary the thickness of the layer of material applied to the work piece from a minimum in which substantially no material is applied to a predetermined maximum thickness, a work supporting carriage, fluid pressure operated means for effecting relative movements between said applicator device and said carriage, first to bring the device into operative relation with a work piece on the carriage and then to cause the device to apply a layer of material on the work piece, and means for effecting angular movement of said device as it begins to apply said layer of material to cause the leading edge of said layer gradually to increase in thickness from said minimum to said predetermined maximum thickness.

19. A machine for applying viscous molten thermoplastic material as a layer adherent to a selected area of a work piece, comprising an applicator device operable to vary the thickness of the layer of material applied to the work piece from a minimum in which substantially no material is applied to a predetermined maximum thickness, a carriage, a work support on said carriage having a raised portion corresponding in shape to the selected area of the work piece to which said layer is to be applied and a portion adjacent to and offset from said raised portion, means for clamping marginal portions of a work piece against the marginal portion of the work support thereby to present only said selected area of the work piece to the action of the applicator device during relative movements between said device and the carriage to cause the device to act on the work piece, means for effecting relative movements between said activator device and said carriage, first to bring the device into operative relation with the work piece on the carriage and then to cause the device to apply a layer of material on said selected area of the work piece, and means for operating said device as it begins to apply said layer of material to cause the leading edge of said layer accurately to increase in thickness from said minimum to said predetermined maximum thickness.

20. A machine for applying viscous molten thermoplastic material as a layer adherent to a selected area of a work piece, comprising an applicator device having an applicator roll and a scraper member movable angularly about the axis of said roll to cause the scraper to remove more or less of the material applied by the roll to vary the thickness of the layer of material applied to the work piece from a minimum in which substantially no material is applied to a predetermined maximum thickness, a carriage, a work support on said carriage having a raised portion corresponding in shape to the selected area of the work piece to which said layer is to be applied and a portion adjacent to and offset from said raised portion, means for clamping marginal portions of a work piece against the marginal portion of the work support thereby to present only said selected area of the work piece to the action of the applicator device during relative movements between said device and the carriage to cause the device to act on the work piece, means for effecting relative movements between said applicator device and said carriage, first to bring the device into operative relation with a work piece on the carriage and then to cause the device to apply a layer of material on said selected area of the work piece, and means for effecting angular movement of said device as it begins to apply said layer of material to cause the leading edge of said layer gradually to increase in thickness from said minimum to said predetermined maximum thickness.

References Cited by the Examiner

UNITED STATES PATENTS

| | | | |
|---|---|---|---|
| 1,931,528 | 10/1933 | Cosgrove | 118—204 |
| 2,110,938 | 3/1938 | Nutt | 118—211 |

CHARLES A. WILLMUTH, *Primary Examiner.*

LEON G. MACHLIN, *Assistant Examiner.*